United States Patent
Sundström et al.

(10) Patent No.: US 12,225,431 B2
(45) Date of Patent: Feb. 11, 2025

(54) OPERATING AN ELECTRONIC DEVICE DURING TRANSPORT

(71) Applicant: Sony Group Corporation, Tokyo (JP)

(72) Inventors: Henrik Sundström, Basingstoke (GB); Mattias Falk, Basingstoke (GB); Magnus Tillgren, Basingstoke (GB); Thomas Fänge, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 381 days.

(21) Appl. No.: 17/592,334

(22) Filed: Feb. 3, 2022

(65) Prior Publication Data

US 2022/0312152 A1   Sep. 29, 2022

(51) Int. Cl.
*H04W 4/029* (2018.01)

(52) U.S. Cl.
CPC .................................. *H04W 4/029* (2018.02)

(58) Field of Classification Search
CPC ......... H04W 4/029; H04W 4/35; H04W 4/38; H04W 52/0216; H04W 52/0258; H04W 4/025; G06Q 10/06; G06Q 50/40; H04M 1/72412; H04M 1/72454; H04M 1/72463
See application file for complete search history.

(56) References Cited

U.S. PATENT DOCUMENTS

| | | |
|---|---|---|
| 9,095,001 B2 | 7/2015 | Lemmon |
| 9,955,294 B2 | 4/2018 | Lee |
| 10,488,526 B2 | 11/2019 | Turon |
| 2010/0280750 A1* | 11/2010 | Chen ................ G01C 21/22 701/465 |
| 2013/0295904 A1* | 11/2013 | Putman ............ H04W 52/0274 455/418 |
| 2016/0241707 A1 | 8/2016 | Lee |
| 2023/0156596 A1* | 5/2023 | Amir ................ H04W 52/0216 370/311 |

FOREIGN PATENT DOCUMENTS

| WO | 2013044399 A1 | 4/2013 |
|---|---|---|
| WO | 2013165847 A1 | 7/2013 |
| WO | 2014057350 A2 | 4/2014 |
| WO | 2015144210 A1 | 10/2015 |

OTHER PUBLICATIONS

Office Action and Search Report from corresponding Swedish Application No. 2150382-6, mailed on Oct. 20, 2021, 8 pages.

* cited by examiner

*Primary Examiner* — Lester G Kincaid
*Assistant Examiner* — Abdullah Al Mamun
(74) *Attorney, Agent, or Firm* — Tucker Ellis LLP

(57) ABSTRACT

An electronic device includes a sensor system and is configured to perform a control method to reduce the power consumption during transportation, for example by aircraft. According to the control method, the electronic device evaluates sensor data from the sensor system for detection of a first condition that indicates that a specific mode of transport of the electronic device has begun; switches the electronic device from a first state to the second state upon detection of the first condition; obtains a predicted time to arrival at a destination; performs a status check at a selected time point in relation to the predicted time of arrival, for detection of an arrival of the electronic device at the destination; and switches the electronic device from the second state to the first state upon detection of the arrival.

20 Claims, 6 Drawing Sheets

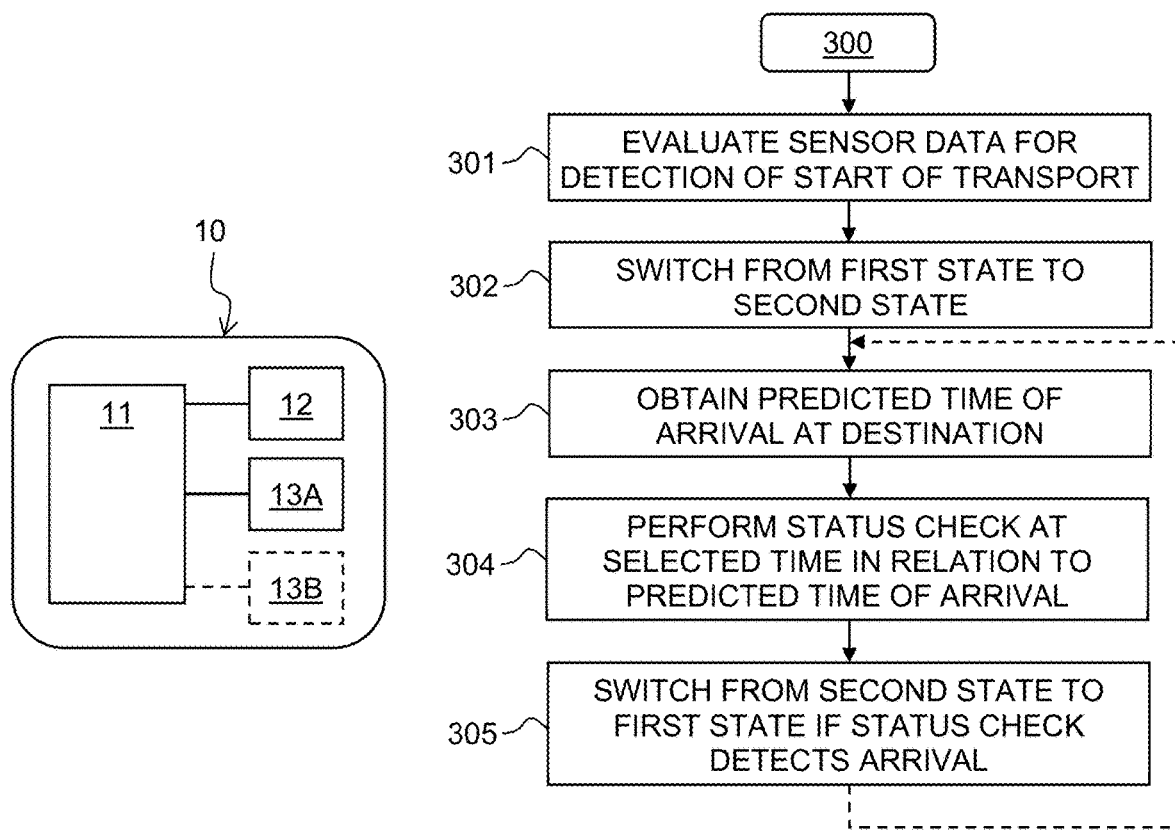
FIG. 2
FIG. 3A
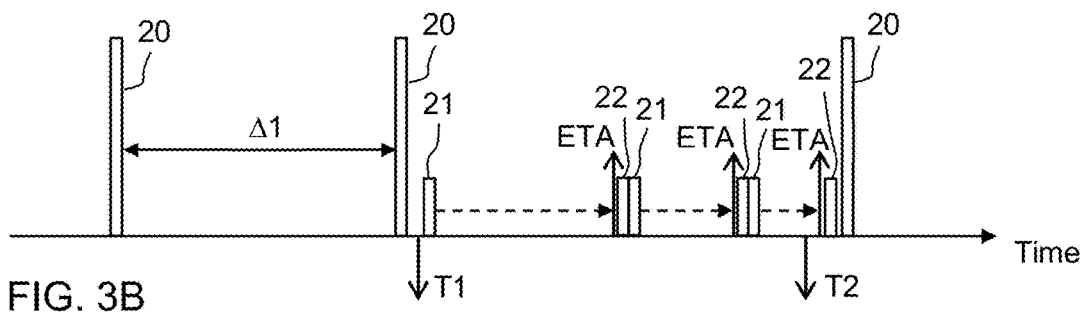
FIG. 3B
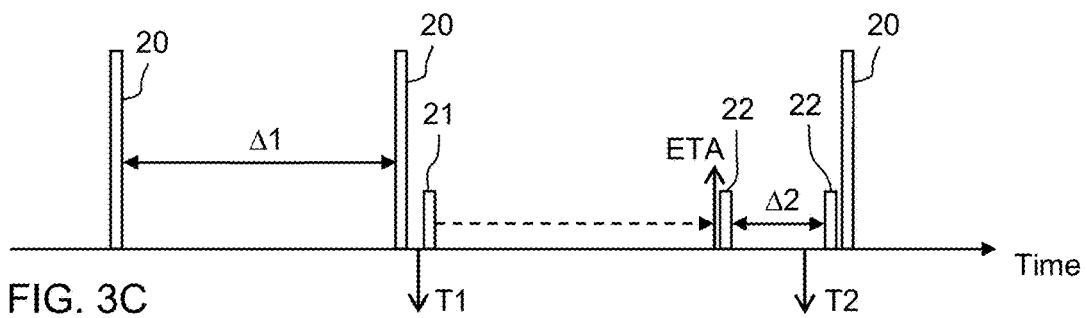
FIG. 3C

OPERATING AN ELECTRONIC DEVICE DURING TRANSPORT

RELATED APPLICATION DATA

The present application claims priority to Swedish Patent Application No. 2150382-6, filed on Mar. 29, 2021, the content of which is incorporated herein by reference in its entirety.

TECHNICAL FIELD

The present disclosure relates to functions in electronic devices and, in particular, techniques for operating an electronic device during transport by a specific mode of transport, such as by aircraft or ship.

BACKGROUND

Airlines generally prohibit the use of equipment that transmits radio-frequency (RF) signals, such as cellular transmission signals, at least during takeoff and landing to avoid interference with flight navigation systems. It has been proposed to provide electronic devices with an autonomous function that automatically enables/disables cellular communication upon detection of specific aircraft flight events such as takeoff or landing. This function may be used in electronic trackers that are attached or otherwise associated with cargo and configured to transmit position data by cellular communication for tracking the cargo in transit.

There is a general concern that such an autonomous function is power consuming and may drain the power source of the electronic device faster than expected. For example, detection of takeoff and landing may require frequent monitoring of sensor data from one or more sensors in the electronic device, such as an accelerometer, a gyrometer, a pressure sensor, etc.

SUMMARY

It is an objective to at least partly overcome one or more limitations of the prior art.

A further objective is to reduce power consumption of an electronic device during a specific mode of transport, for example by aircraft or ship.

One or more of these objectives, as well as further objectives that may appear from the description below, are at least partly achieved by an electronic device according to the independent claim, embodiments thereof being defined by the dependent claims.

A first aspect of the present disclosure is an electronic device. The electronic device comprises a sensor system, and logic configured to: evaluate sensor data from the sensor system for detection of a first condition, which indicates that a specific mode of transport of the electronic device has begun; switch the electronic device from a first state to a second state upon detection of the first condition; obtain a predicted time to arrival at a destination; perform a status check at a selected time point in relation to the predicted time of arrival, for detection of an arrival of the electronic device at the destination; and switch the electronic device from the second state to the first state upon detection of the arrival.

A second aspect is a method performed by an electronic device comprising a sensor system. The method comprises: evaluating sensor data from the sensor system for detection of a first condition, which indicates that a specific mode of transport of the electronic device has begun; switching the electronic device from a first state to a second state upon detection of the first condition; obtaining a predicted time to arrival at a destination; performing a status check at a selected time point in relation to the predicted time of arrival, for detection of an arrival of the electronic device at the destination; and switching the electronic device from the second state to the first state upon detection of the arrival.

A third aspect is a computer-readable medium comprising instructions which, when installed on a processing system, causes the processing system to perform the method of the second aspect.

Still other objectives, aspects, and technical effects, as well as features and embodiments will appear from the following detailed description, the attached claims and the drawings.

BRIEF DESCRIPTION OF DRAWINGS

Embodiments will now be described in more detail with reference to the accompanying schematic drawings.

FIG. 2 is a block diagram of an example wireless device.

FIG. 3A is a flowchart of an example method performed by a wireless device, FIG. 3B-3C are timing diagrams of operations given by the method in FIG. 3A.

DETAILED DESCRIPTION OF EXAMPLE EMBODIMENTS

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the terms "multiple", "plural" and "plurality" are intended to imply provision of two or more elements, whereas the term "set" is intended to imply a provision of one or more elements. The term "and/or" includes any and all combinations of one or more of the associated listed elements.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Figure 1:
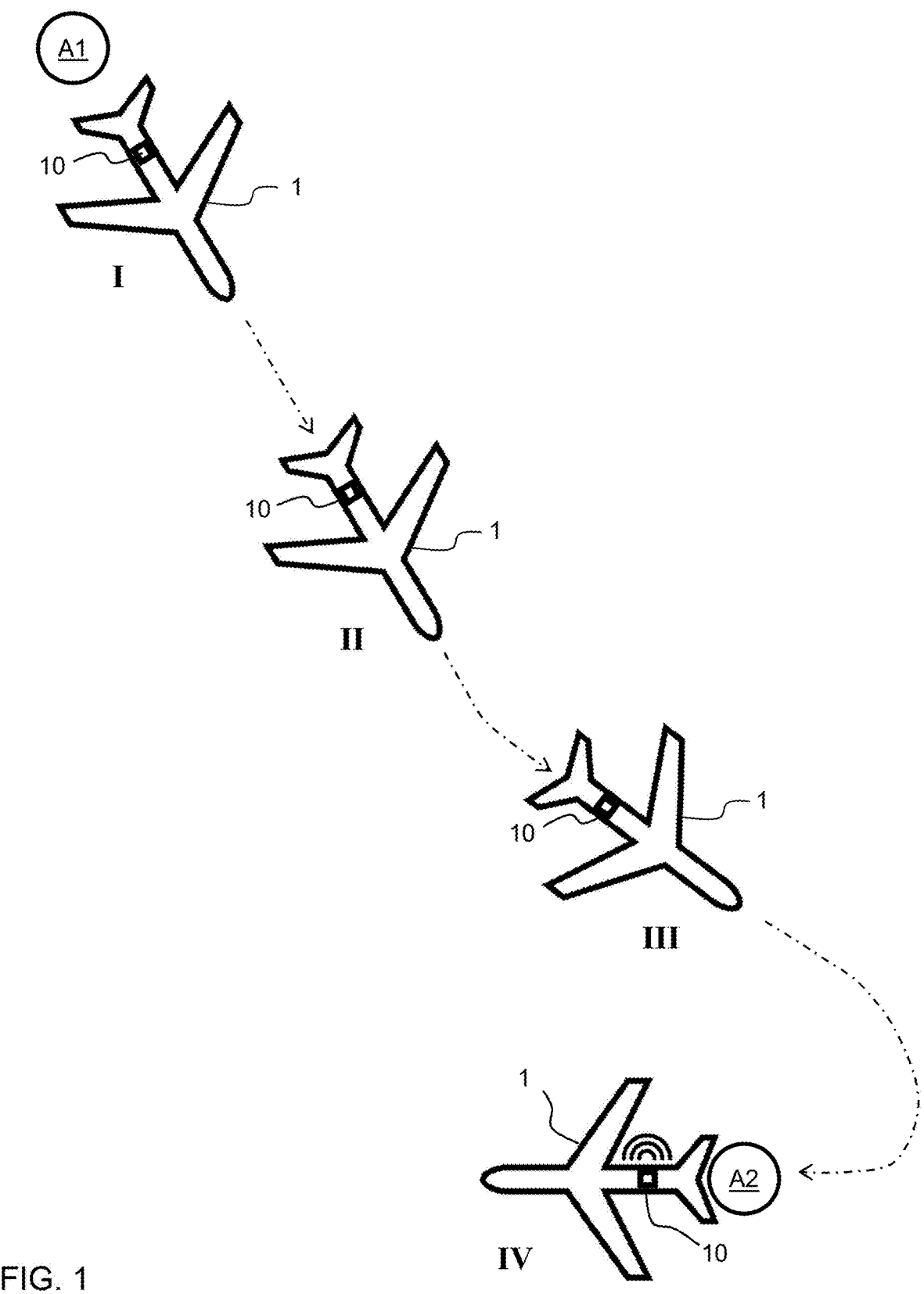
FIG. 1 illustrates a wireless device during transport by an aircraft from one airport to another.

FIG. 1 illustrates a use case of a wireless device in accordance with some embodiments. FIG. 1 shows an aircraft 1 when travelling from a first airport A1 to a second airport A2 and illustrates the aircraft 1 during take-off (I), in-flight (II-III), and after landing (IV). A wireless device 10 is located inside the aircraft 1. As indicated by a transmission symbol, the wireless device 10 operates to intermittently transmit an RF signal over a wireless wide area network (WWAN) when the aircraft 1 has landed at airport A2, but the wireless device 10 refrains from transmitting the RF signal during takeoff and in-flight. Although not shown in FIG. 1, the wireless device 10 may likewise intermittently transmit the RF signal over WWAN during ground transport to airport A1.

In one example, the wireless device 10 is a cargo-tracking device, also known as a logistics tracker, which is attached to or otherwise combined with goods in transport and configured to transmit its position, optionally together with further measured data such as temperature, pressure, moisture etc., by the RF signals. Such a cargo-tracking device may implement an automated function for detecting one or more dedicated flight events, such as takeoff and landing, and automatically prevent WWAN communication upon detection of such a flight event. It may also be desirable to prevent WWAN communication in-flight, to conserve battery power.

FIG. 1 is also applicable to a use case in which the wireless device 10 is a smartphone or other electronic equipment carried by a passenger onto the aircraft 1. Such a wireless device 10 may transmit the RF signals as a result of the passenger using the wireless device 10 for accessing the Internet or placing a phone call. To comply with the above-mentioned regulations, passengers are requested by aircraft staff to turn off all electronic equipment during takeoff and landing. To mitigate the risk that this request is overlooked or ignored by passengers, it is envisioned that future smartphones and other electronic equipment may be provided with an automated function similar to the one in cargo-tracking devices.

FIG. 2 is a schematic view of an example wireless device 10 in accordance with some embodiments. The wireless device 10 comprises a controller or control unit 11, which is configured to control the overall operation of the wireless device 10. The wireless device 10 further comprises a sensor arrangement or sensor system 12 which is configured to generate sensor data that may be processed, stored or transmitted by the wireless device 10. The wireless device 10 has a first transceiver 13A which is configured for any type of WWAN communication, including but not limited to cellular communication under various modes or protocols, such as voice calls, SMS, EMS, or MMS messaging, CDMA, TDMA, PDC, WCDMA, CDMA2000, GPRS, WiMAX, LTE, 5G NR, etc. In some embodiments, the first transceiver 13A is configured for wireless LPWAN (Low Power WAN) communication, for example by comprising components for cellular communication in accordance with 3GPP standards, UNB (Ultra NarrowBand) communication, telegram splitting communication, spread spectrum communication, etc.

As shown by dashed lines in FIG. 2, the wireless device 10 may include a second transceiver 13B, which is configured for wireless short-range communication, for example by one or more of Bluetooth, BLE, WiFi, LR-WPAN, UWB, ZigBee, Z-Wave, etc. Example use of the second transceiver 13B will be described further below with reference to FIGS. 8A-8B.

The sensor system 12 may include any type of sensor that is conventionally used for detecting takeoff or landing of an aircraft. For example, the sensor system 12 may include one or more of a pressure sensor for sensing ambient pressure, a motion sensor or vibration sensor for sensing own motion, or a sound detector for sensing ambient sound. The pressure sensor may be of any type and may measure ambient pressure (absolute or relative) inside the wireless device 10 or in the surroundings of the wireless device 10. The motion sensor may be of any type and may measure one or more of acceleration, velocity or orientation, in absolute terms or in one or more directions. The motion sensor may include one or more of an inertial measurement unit (IMU), an accelerometer with any number of axes, a gyroscope, a magnetometer, etc. The vibration sensor may be of any type and may measure mechanical vibrations experienced by wireless device 10, in one or more frequency ranges. In some embodiments, the vibration sensor is tailored to detect mechanical vibrations generated by an aircraft, for example during takeoff or landing. The sound detector may be of any type and may measure the magnitude of sound waves inside or in the surroundings of the wireless device 10, in one or more frequency ranges. In some embodiments, the sound detector is tailored to detect sound that is typical to an operating aircraft, for example during takeoff or landing.

The wireless device 10 in FIG. 2 may be any type of electronic device configured for wireless communication, such as a cargo-tracking device, a mobile phone, a smart phone, a personal digital assistant (PDA), a tablet computer, a laptop computer, an IoT (Internet-of-Things) device, a wearable computer, etc.

In the following disclosure, it is assumed that the wireless device 10 may be switched between a set of states, which includes at least a first state and a second state. A switch between the first state and the second state may be direct or via an intermediate state. In the first state, the transceiver 13A is enabled, which implies that the wireless device 10 is allowed to transmit data via transceiver 13A and may also be allowed to receive data via transceiver 13A. In the second state, the transceiver 13A is disabled, which implies that the wireless device 10 is forbidden to transmit data via transceiver 13A and may also be forbidden to receive data via transceiver 13A. In some embodiments, the second state corresponds to a conventional "flight mode".

With reference to the use case in FIG. 1, the wireless device 10 is in the first state during take-off (I) and in-flight (II, III), and in the second state after landing (IV).

The operation of the wireless device 10 is further exemplified in FIG. 3B for a logistics tracker. When in the first state, the device repeatedly transmits position data, and possibly further data, by WWAN communication for receipt of a server (not shown). The position data represents the current geographic location of device 10 and may be obtained from a positioning system in the device 10, for example a GNSS receiver. In FIG. 3B, the data transmission is represented by block 20 and occurs repeatedly at a nominal time interval Δ1. In some embodiments, the device 10 is disconnected from the WWAN during the time interval, Δ1, to save power. At time T1, the device 10 detects takeoff and switches to the second state, in which WWAN communication is disabled (forbidden) while the device 10 is airborne. At time T2, the aircraft lands. When the device 10 detects that it is no longer airborne, it switches to the first state and again starts to repeatedly transmit position data, as indicated by block 20.

It should be noted that the device 10 detects that it has landed from sensor data provided by its sensor system 12. This means that the power consumption of the device may be considerable in the second state if the device frequently obtains and analyzes sensor data for detection of landing. Embodiments are directed to a technique of saving power of the wireless device 10 while in the second state.

It may also be noted that the problem of high power consumption in the second state is applicable outside the field of air transportation. For example, it may be desirable for the wireless device to be in the second state when it is on open sea with limited access to WWAN, to avoid that power is consumed by repeated connection attempts. In such a use case, power savings in the second state may be offset by the need for the device to analyze sensor data for detection that the transport on water has ended. Thus, the desire to reduce the power consumption in the second state is generally applicable whenever the wireless device is set in the second state during a specific mode of transport, for example any type of non-land-based transport such as by aircraft or ship. As used herein, the term "specific mode of transport" implies that the wireless device is capable of distinguishing the specific mode of transport from other modes of transport. For example, the wireless device may be able to distinguish non-land-based transports or transports by aircraft from other modes of transports.

FIG. 3A is a flowchart of an example method 300 performed by a wireless device in accordance with some embodiments. The example method 300 presumes that the wireless device is initially in the first state. In step 301, sensor data from the sensor system 12 is evaluated for detection of a first condition, which indicates that a specific mode of transport of the wireless device 10 has begun. In the example of air transportation, the first condition may comprise one or more characteristic properties of an aircraft during takeoff (cf. I in FIG. 1). Such characteristic properties may include absolute pressure, a change in absolute pressure in relation to a preceding time step, a variability in pressure during a time window, acceleration, velocity, orientation, sound intensity in one or more frequency ranges, vibration intensity in one or more frequency ranges, one or more statistical metrics (mean, standard deviation, RMS, etc.) for acceleration, velocity, orientation, sound intensity, or vibration intensity within a time window, etc. The skilled person realizes that similar or other characteristic properties may be defined to detect start of transport for other modes of transportation. In step 302, the wireless device 10 is switched from the first state to the second state upon detection of the first condition by step 301. In step 303, a predicted time of arrival at a destination for the started transport is obtained. In the following, the predicted time of arrival will also be referred to as ETA (estimated time of arrival). Examples of step 303 will be discussed below with reference to FIG. 3E. Step 304 performs a status check at a selected time point in relation to ETA, to detect if the wireless device 10 has arrived at the destination. The status check may be seen as an evaluation of the context of the device—if the device is in the context of the specific mode of transport or not. In some embodiments, the selected time point is at or after ETA. Performing the status check slightly after ETA may reduce the need to perform additional status checks (see below). In other embodiments, the selected time point is set a predefined time period before ETA, for example if switching to the first state has higher priority than reducing power consumption. In step 305, the wireless device is switched from the second state to the first state when it is detected, in step 304, that the wireless device 10 has arrived at the destination.

In some embodiments, the status check in step 304 may comprise outputting a question to an operator on an interface of the device and waiting for a response from the operator via the interface. However, in other embodiments, the status check is performed autonomously by the device 10. For example, the sensor data from the sensor system 12 may be evaluated, in step 304, for detection of a second condition, which is indicative of the arrival of the wireless device 10 at the destination. The second condition may be defined in correspondence with the first condition. In the example of air transportation, the second condition may comprise one or more characteristic properties of an aircraft during and/or after landing. In such an example, step 304 may be seen to correspond to detecting that landing is completed, which implies that the aircraft is on the ground or is about to touch the ground.

As indicated by a dashed arrow in FIG. 3A, the method 300 may repeat steps 303-305 until arrival at the destination is detected in step 304. An example of the operation of the device 10 is illustrated by a timing diagram in FIG. 3B, in which block 21 represents step 303 and block 22 represents step 304. As shown, after detecting start of transport at T1, the device obtains ETA in block 21 and schedules a status check slightly after ETA. If the status check by block 22 fails to detect arrival, the device obtains a new ETA in block 21 and schedules another status check in relation to the new ETA. In FIG. 3B, this is repeated once more before arrival at the destination is detected by step 304 (block 22). Then, the device 10 is switched to the first state and resumes data transmission over WWAN, as represented by block 20. The embodiment illustrated in FIG. 3B may be seen to non-periodically repeat the status check at varying time intervals, which are set in relation to ETA. FIG. 3B shows that by repeating steps 303-305, the time delay between actual arrival (T2) and detection of arrival (block 22) may be small, depending on the accuracy of ETA.

An alternative is shown in FIG. 3C. Here, instead of repeating steps 303-305 if the status check by step 304 fails to detect arrival, the method 300 periodically repeats steps 304-305 at a second time interval Δ2. The embodiment illustrated in FIG. 3C may be seen to periodically repeat the status check at a fixed time interval which is set in relation to ETA. Depending on the length of the time interval Δ2, the time delay between actual arrival (T2) and detection of arrival (block 22) may be small. However, a small time interval Δ2 may result in increased power consumption by potentially increasing the number of status checks.

Figure 3D:
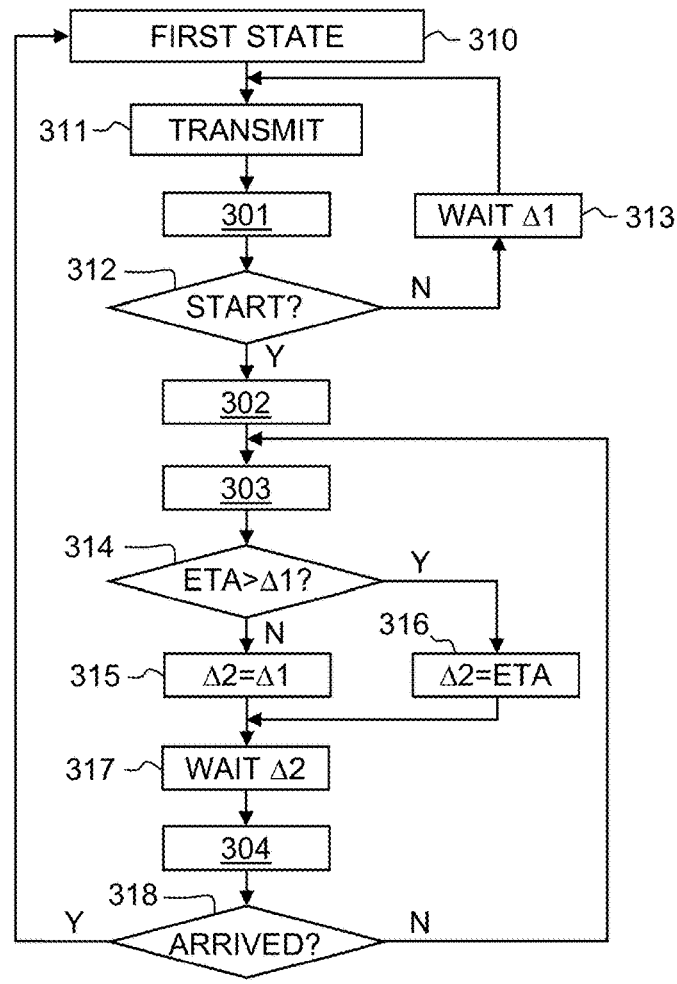
FIG. 3D is a flow chart of an implementation example of the method in FIG. 3A.

FIG. 3D is a flowchart of an example method of operating a wireless device 10 in accordance with the method 300 in FIG. 3A.

As indicated by step 310, the method starts with device 10 in the first state. For example, the device 10 may be in transit by transportation on ground. Steps 311-313 are arranged to operate the device 10 to transmit data at regular intervals and to detect when a specific mode of transport is started. Thus, in step 311, data is transmitted over WWAN by use of the transceiver 13A for receipt by a server. Then, the device performs step 301. If start of transport is not detected in step 301, the method proceeds to step 313, in which the method waits Δ1 before proceeding to step 311. Here, Δ1 may be set in relation to the last execution of step 311 or step 301. If start of transport is detected in step 301, step 312 proceeds to step 302 in which the device 10 is switched to the second state, and step 303 in which ETA is obtained. Steps 314-318 are arranged to schedule the status check not only in view of ETA but also in view of Δ1. Specifically, in the illustrated example, steps 314-318 ensure that Δ2 is not smaller than Δ1. In step 314, the method checks if ETA is larger than Δ1. If not, the method proceeds to step 315, in which Δ2 is set equal to Δ1. If ETA is larger than Δ1, the method proceeds to step 316, in which Δ2 is set equal to ETA. After steps 315 and 316, the method proceeds to step 317, in which the method waits Δ2 before proceeding to step 304. If arrival is not detected in step 304, step 318 proceeds to step 303, in which a new ETA is obtained. If it is detected in step 304 that the device has arrived at the destination, step 318 proceeds to step 310, and the device 10 is switched to the first state. In contrast to the timing of operations shown in FIGS. 3B-3C, the method in FIG. 3D ensures that consecutive status checks are at least separated in time by Δ1, and also that the initial status check during transport is separated from the last WWAN transmission (block 20) by at least Δ1. This ensures a low power consumption of the wireless device 10 in the second state, albeit at the risk of a larger time delay between actual arrival (T2) and detection of arrival by step 304 (block 22).

Reverting to FIG. 3A, step 303 may generally determine ETA for a current value of elapsed time ("current elapsed time") or a current value of estimated travel distance ("current travel distance"). The current elapsed time or current travel distance is given in relation to the time point when step 301 detected the first condition and the device was switched to the second state. In some embodiments, the nominal total duration or nominal total travel distance of the ongoing transport may be known to the device 10, for example from external information such as a flight schedule or shipping schedule. In such embodiments, step 303 may determine ETA by relating the current elapsed time to the nominal total duration or the current travel distance to the nominal total travel distance. If step 303 is then repeated, which infers that the device 10 had not arrived at ETA, step 303 may determine a current travel distance and determine a new ETA by relating the current travel distance to the nominal total travel distance, for example in view of an estimated current or average speed of travel.

To determine the elapsed time, the device 10 may comprise a clock, timer or the like, which is operated to continuously measure the elapsed time from step 302 in FIG. 3A. The travel distance may be estimated by use of geographic locations determined by a GNSS receiver (if present) in the device 10. In one example, the travel distance is calculated as the difference between the current geographic location and the geographic location of the starting point of the on-going transport. In another example, the travel distance is calculated by accumulating distances between consecutive geographic locations measured during the on-going transport. Alternatively or additionally, the travel distance may be estimated by dead reckoning based of sensor data from a motion or vibration sensor in the sensor system 12, or by any other relative or absolute positioning method. In an aircraft, travel distance may be derived from positions included in periodic ADS-B (Automatic Dependent Surveillance-Broadcast) signals that are transmitted by the aircraft during flight.

Figure 3E:
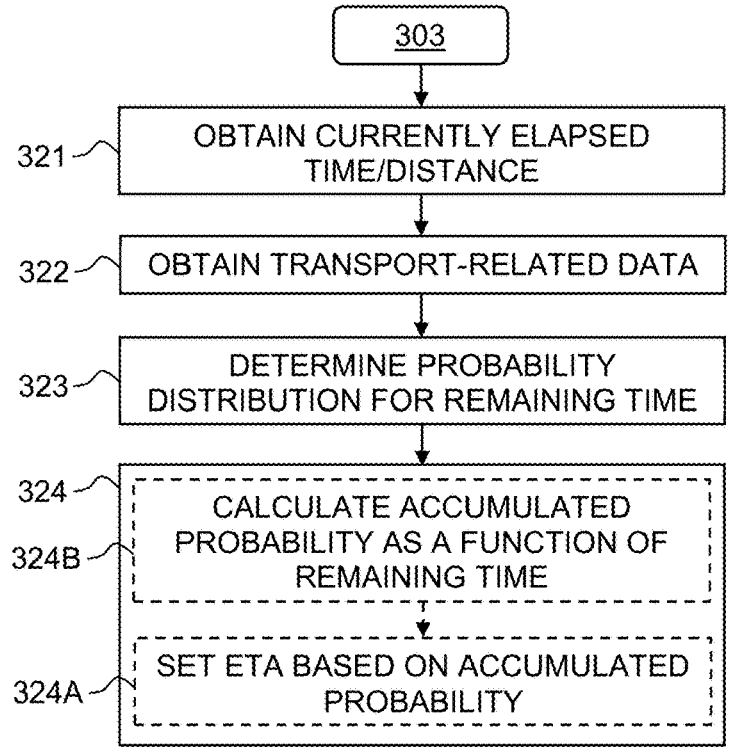
FIG. 3E is a flow chart of an example method corresponding to a step in the methods of FIGS. 3A and 3D.

Often the destination is not known to the device 10. FIG. 3E is a flowchart of an example procedure that corresponds to step 303 and enables the device 10 to obtain the ETA with more limited or no external information about the ongoing transport. Step 321 obtains the above-mentioned current elapsed time or current travel distance. Step 322 obtains transport-related data, TRD, for example from an internal memory of the device 10. The TRD may be pre-stored in the memory, be received by WWAN communication when the device 10 is in the first state (cf. FIG. 4 below) or be otherwise received by wireless communication when the device 10 is in the second state (cf. FIGS. 8A-8B below), or by any combination thereof. Step 323 determines a probability distribution for the remaining time of transport, based on TRD from step 322 and the current elapsed time or current travel distance from step 321. Such a probability distribution is suitably determined to represent conditional probability. The conditional probability refers to a probability which is specifically determined at the current elapsed time or current travel distance. Step 324 then determines the ETA based on the probability distribution.

In accordance with some non-limiting examples, TRD may include one or more of the following: statistical data of durations of (previous/future) transports of the device 10 and/or other devices, an identifier of the departure point for the transport of the device 10, route data that indicates candidate transport routes for the transport of the device 10, or a transport route for the ongoing transport. For example, the statistical data may include historical and nominal (planned) departure times, historical and nominal (planned) arrival times, etc., for different routes from different points of departure. Alternatively or additionally, the statistical data be aggregated in different ways. The "other devices" may be part of the group of wireless devices discussed below with reference to FIGS. 8A-8B. The identifier of the departure point may be an identifier of an airport or harbor. Each of the candidate transport routes may be given by a departure point in combination with one or more of a destination, a nominal total duration, or a nominal total travel distance. In some embodiments, TRD includes at least the statistical data.

The skilled person realizes that a probability distribution for the remaining time of transport may be determined by the device irrespective of how specific the TRD is to the ongoing transport. Thus, even if the TRD only includes generic transport information, such as statistical data and/or route data, the device 100 is capable of determining a probability distribution for the remaining time of transport. The skilled person also realizes that the ETA may be determined from such a probability distribution, in different ways.

In FIG. 3E, as indicated by dashed lines, step 324 may comprise a step 324A, in which the probability distribution is processed to calculate accumulated probability as a function of the remaining time. The accumulated probability is calculated by aggregating (for example, summing), for each value of the remaining time, the probability values for this value and all smaller values of the remaining time. Step 324A may be seen to result in an accumulated probability function. Step 324 may further comprise step 324B, in which the ETA is set to the remaining time that results in a predefined value of the accumulated probability. Worded differently, the predefined value is a target probability, and the ETA is the remaining time that gives the target probability in the accumulated probability function. The combination of steps 324A, 324B is an efficient way of determining the ETA.

Figure 5A:
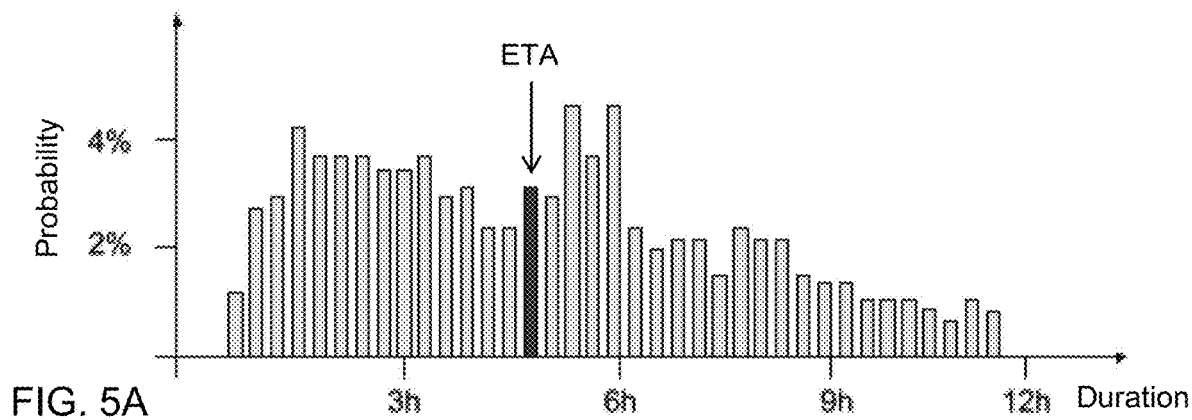
FIGS. 5A-5B are graphs of probability distributions determined by a wireless device at two time points during a transport in accordance with a first example.
Figure 5B:
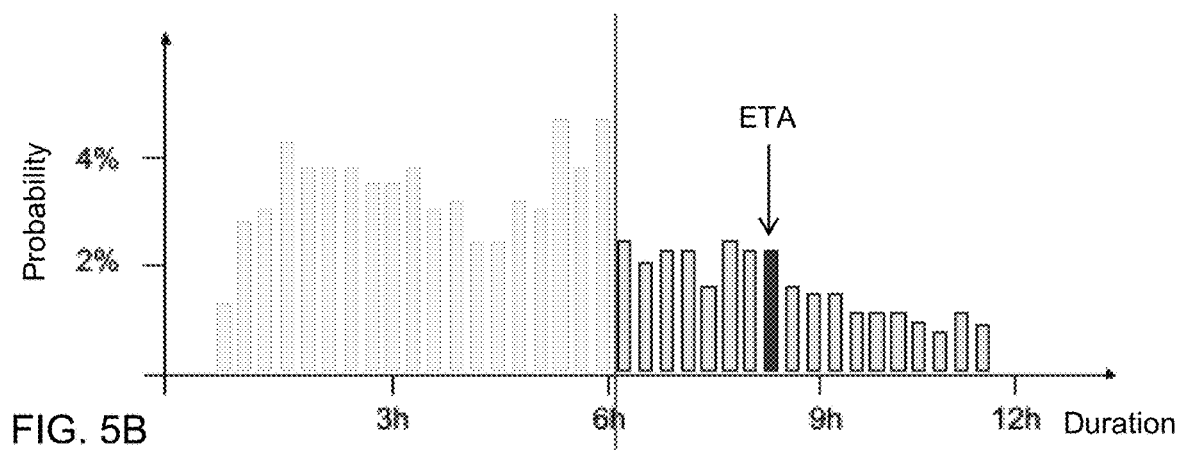

For examples of the procedure in FIG. 3E, reference is made to FIGS. 5-7. FIG. 5A shows a probability distribution determined by step 323 based on TRD comprising the above-mentioned statistical data. In some embodiments, step 323 comprises re-arranging the statistical data into a histogram as shown in FIG. 5A. The probability distribution in FIG. 5A is determined by step 323 upon entry into the second state, for example directly after takeoff of an aircraft. FIG. 5A also indicates the ETA (approx. 4.8 h) that is determined by step 324 in accordance with steps 324A-324B, with a target probability of 50%. This means that ETA is set so that 50% of the transports are longer and 50% are shorter than ETA. FIG. 5B shows a corresponding probability distribution which is determined by step 323 when the device has been in the second state for 6 hours, i.e. when the current elapsed time is 6 hours. At this time, step 323 may determine the probability distribution by disregarding all transports with a duration shorter than 6 hours (to the left of the vertical line). Although not shown in FIG. 5B, step 323 may also involve scaling the remaining probability values so that their sum is 1, for example by linear scaling. In FIG. 5B, the target probability of 50% results in an ETA of approx. 8 h.

Figure 6A:
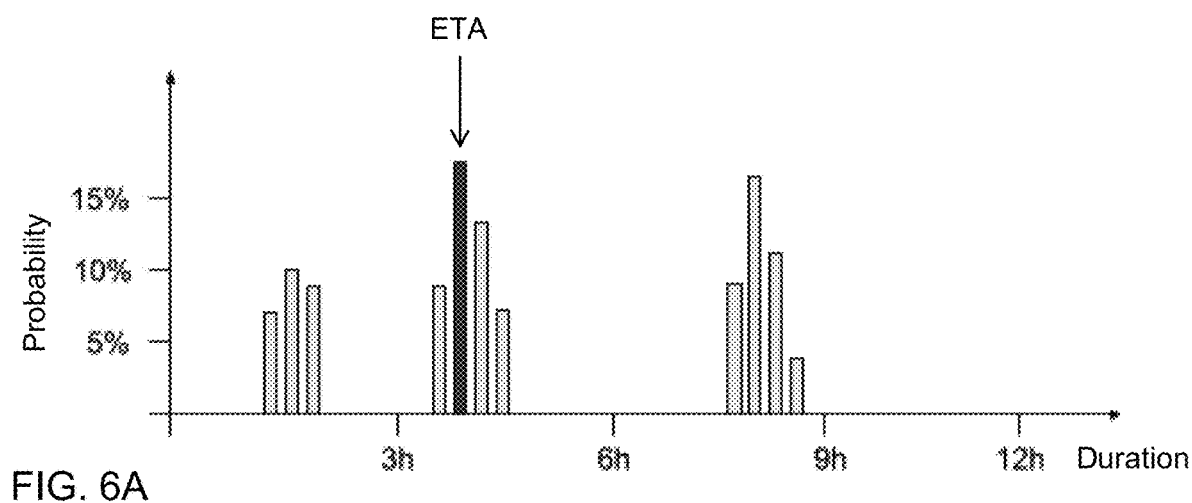
FIGS. 6A-6B are graphs of probability distributions determined by a wireless device at two time points during a transport in accordance with a second example.

FIG. 6A shows a probability distribution determined by step 323 based on TRD comprising statistical data, route data, and a point of departure. In the illustrated example, step 323 comprises identifying, in the TRD, routes to three different destinations at different distances from the departure point and determining the probability distribution of FIG. 6A upon entry into the second state. In the example of FIG. 6A, ETA is set to approx. 3.8 h, using a target probability of 50%. When the device has been in the second state for 4 hours, step 323 in executed to determine a new probability distribution, shown in FIG. 6B. Here, the target probability of 50% results in an ETA of approx. 8 h.

Figure 6B:
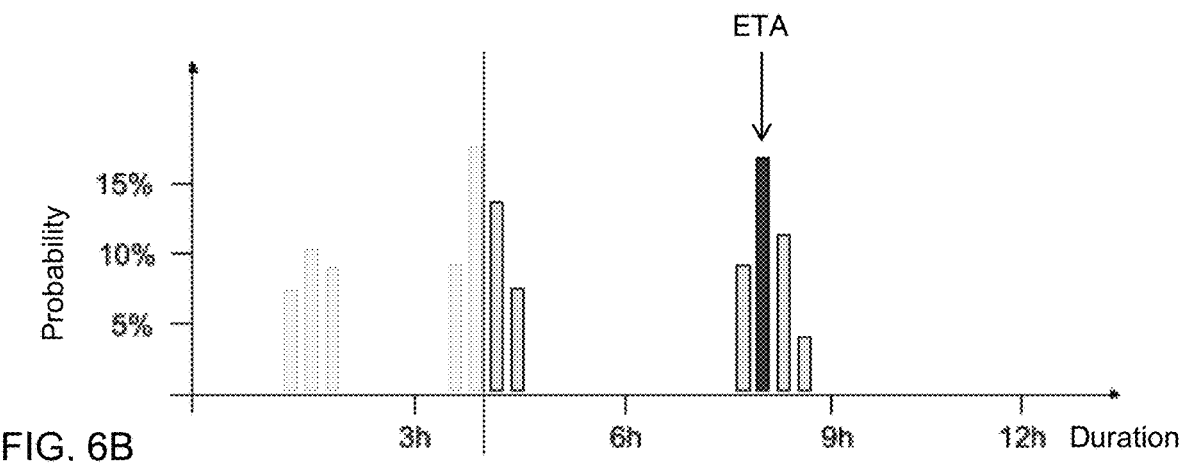
Figure 7A:
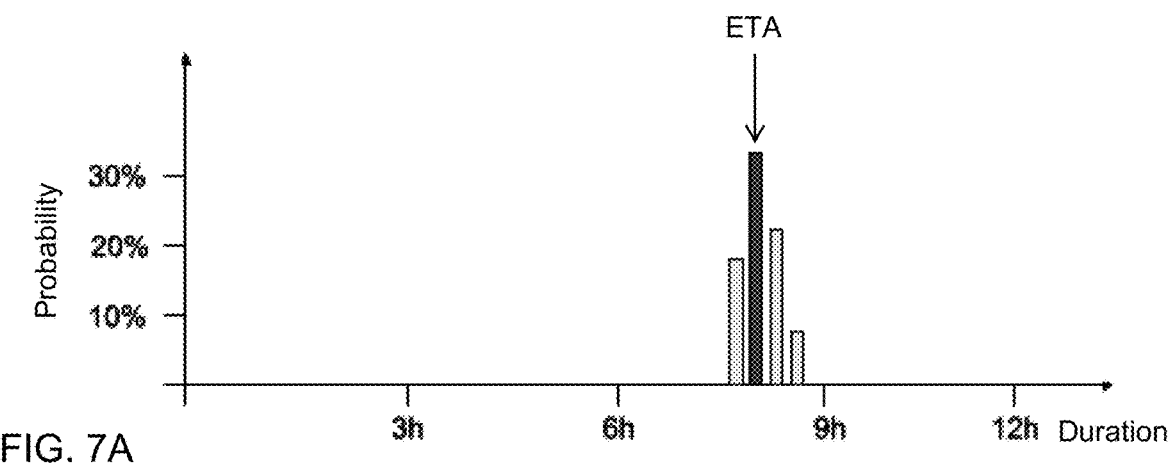
FIGS. 7A-7B are graphs of probability distributions determined by a wireless device at two time points during a transport in accordance with a third example.
Figure 7B:
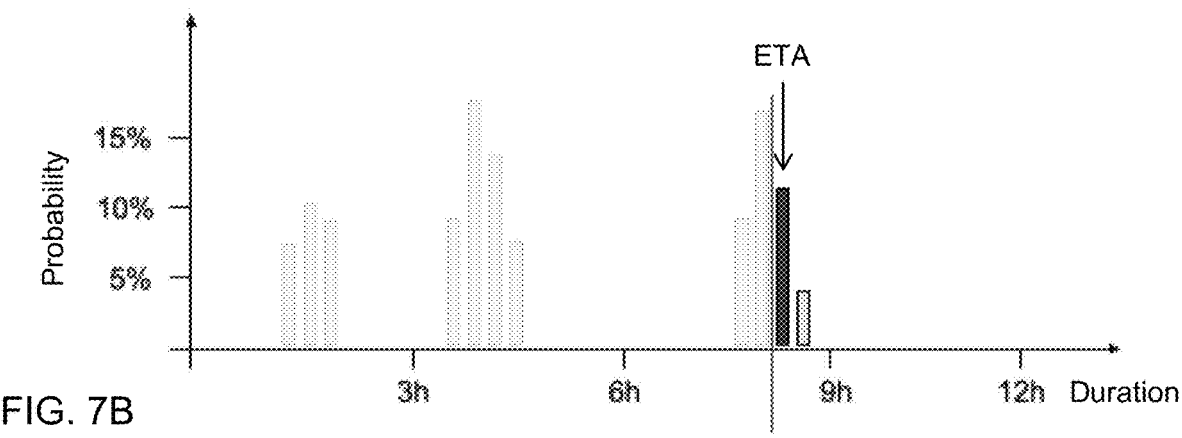

FIG. 7A shows a probability distribution determined by step 323 by use of an identifier of the transport route for the ongoing transport, in addition to the TRD used in FIGS. 6A-6B. In the example of air transportation, the identifier may be a flight identity. In some embodiments, the flight identity may be obtained from the above-mentioned ADS-B signal, in step 322 (FIG. 3E). In the illustrated example, step 323 comprises identifying, in the TRD, statistics of this specific transport route and determining the probability distribution of FIG. 7A upon entry into the second state. In the example of FIG. 7A, ETA is set to approx. 8 h, using a target probability of 50%. When the device has been in the second state for 8 hours, step 323 in executed to determine a new probability distribution, shown in FIG. 7B. Here, the target probability of 50% results in an ETA of approx. 8.2 h.

Figure 4:
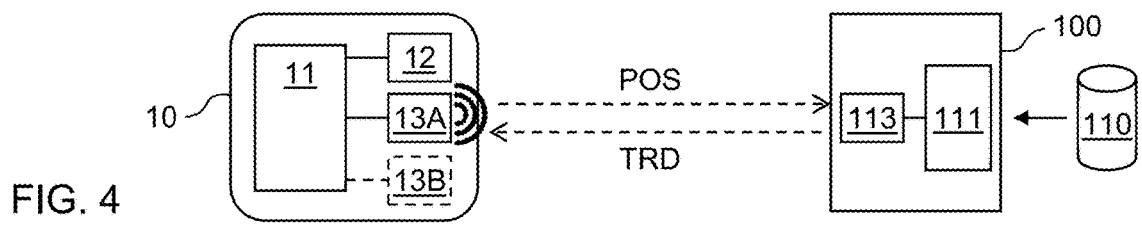
FIG. 4 is a block diagram of the wireless device of FIG. 2 in WWAN communication with a server.

FIG. 4 is a block diagram of the wireless device 10 and a server 100. The server 100 comprises a communication module 113 operable to communicate with the device 10 when the device 10 is connected to a WWAN (first state). The server 100 further comprises a control unit 111. The server 100 is further connected to a local or remote database 110, which stores information about transports from one or more departure points. As shown by dashed arrows, the device 10 transmits position data, POS, to the server 100, which returns TRD to the device 10. In some embodiments, TRD is provided by the server 100 to be relevant to the position data, POS. For example, the server 100 may identify a nearby departure point (for example, an airport) based on POS and provide TRD for this airport. It is conceivable that the server 100 only provides TRD for a departure point if POS is sufficiently close to the departure point. It is also conceivable that the server 100 only provides the same TRD once. For example, if a time sequence of received POS from the device 10 are close to the same departure point, the server 100 will only transmit TRD for this departure point once.

The server 100 may obtain the TRD from different sources. In the example of air transportation, the TRD may be representative of flights that depart from an airport given by POS. Alternatively or additionally, TRD may be representative of historic flights performed by the wireless device 10 or by other wireless devices from an airport given by POS. For example, a logistics provider may have a database of all flights performed by their trackers, and the server 100 may derive the TRD from such a database.

Upon receiving TRD, the device 10 may store TRD in internal memory, for use by step 322 (FIG. 3E). The device 10 may implement a memory management function, which deletes TRD from the internal memory according to some logic, for example based on usage and/or residence time. It is also conceivable that the internal memory is preconfigured to store default TRD.

In some embodiments, the wireless device 10 is included in a group of wireless devices that are all operable to receive TRD from a server, and possibly perform the method 300. In some examples, the group comprises logistics trackers from a specific manufacturer or logistics trackers that are deployed by one or more logistic companies, transportation service providers, etc. In another example, the group comprises smartphones from a specific manufacturer or a specific network operator.

In some embodiments, the wireless devices in such a group of wireless devices are configured to share, by wireless short-range communication, information related to TRD and/or ETA determined by step 303. This is a powerful improvement, since it enables wireless devices that are brought within range of each other to obtain, by the sharing, relevant TRD and/or ETA. For example, if a wireless device receives no or incorrect TRD from the server before departure, it may still receive appropriate TRD from another wireless device, before or after departure. Also, a wireless device may update its calculated ETA by use of ETAs received from other devices, for example by (weighted) averaging.

Figure 8A:
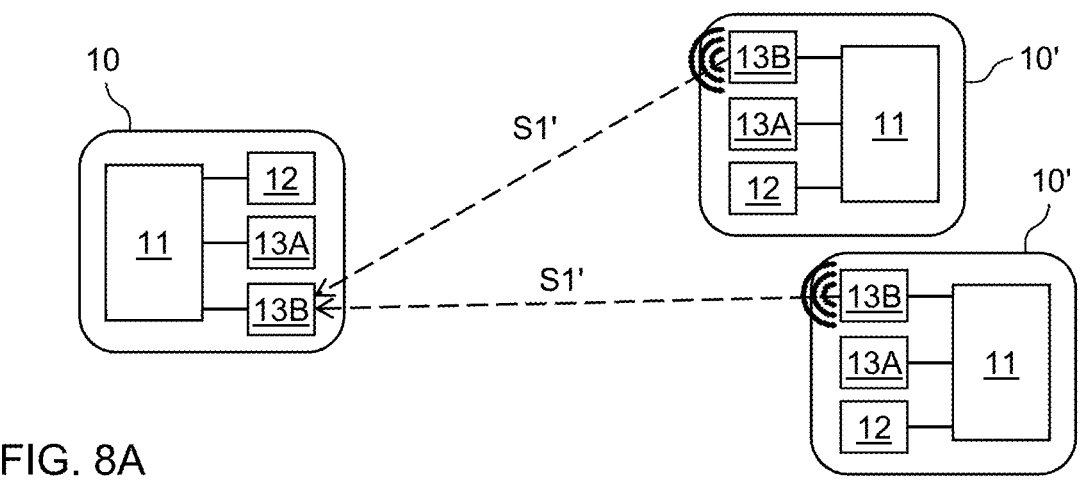
FIGS. 8A-8B are views of the wireless device of FIG. 2 in short-range wireless communication with other wireless devices within range.
Figure 8B:
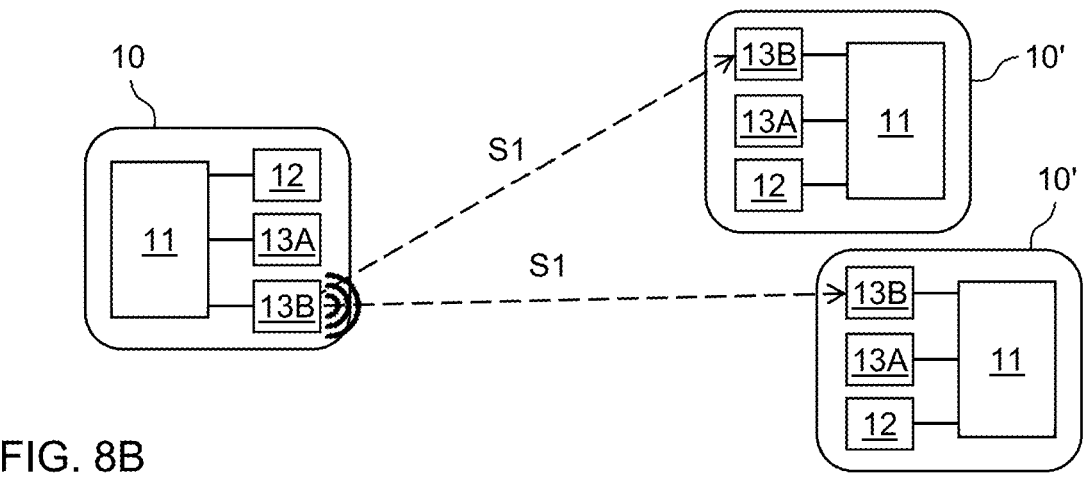

FIG. 8A illustrates a wireless device 10 and two other wireless devices 10', which are located within range for short-range wireless communication. As shown, each of the other wireless devices 10' comprises a controller 11, a sensor system 12 and first and second transceivers 13A, 13B. As indicated by transmission symbols, the devices 10' operate their transceivers 13B to transmit a sharing signal S1', which is received by the transceiver 13B of the wireless device 10. FIG. 8B corresponds to FIG. 8A and shows that the device 10 operates its transceiver 13B to transmit a sharing signal S1, which is received by the transceivers 13B of the wireless devices 10'. For example, the wireless devices 10, 10' may be logistics trackers which are co-located in a cargo compartment of an aircraft, or smartphones carried by passengers on an aircraft.

In FIG. 8A, the sharing signals S1' may include at least part of the TRD stored by the respective device 10'. Alternatively or additionally, the sharing signal S1 may include the ETA that has been determined by the respective device 10' by method 300. In FIG. 8B, the sharing signal S1 may include at least part of the TRD stored by device 10, and/or the ETA determined by method 300 when executed by device 10.

In some embodiments, the wireless devices 10, 10' are configured to broadcast outgoing sharing signals and to listen for incoming sharing signals, in accordance with any scheme. The use of broadcasting allows the respective wireless device to dynamically communicate with any number of other wireless devices within range, without requiring any preceding coordination process, such as pairing. However, in an alternative embodiment, the wireless devices 10, 10' are paired before exchanging sharing signals.

In some embodiments, each of the wireless devices 10, 10' in the group is configured to both transmit and receive sharing signals. However, it is also conceivable that the group includes one or more wireless devices configured to only transmit or receive sharing signals.

Figure 9:
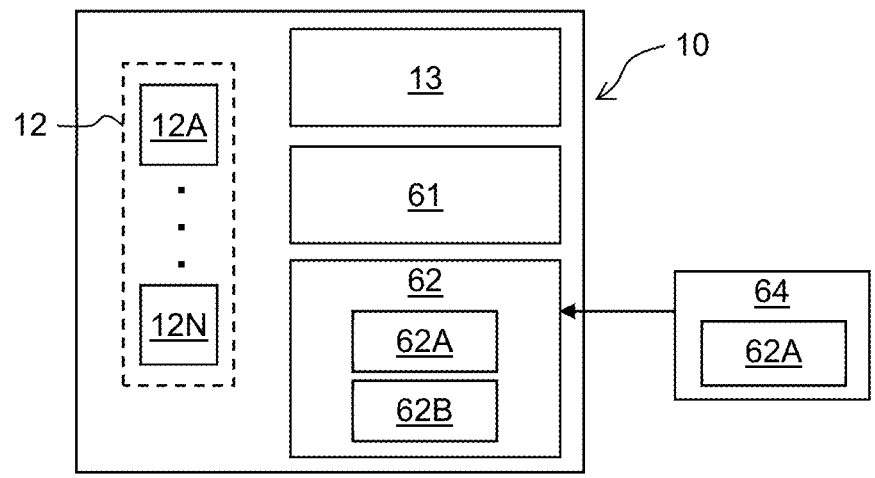
FIG. 9 is a block diagram of a machine that may implement any one of the methods, procedures and functions described herein.

The structures and methods disclosed herein may be implemented by hardware or a combination of software and hardware. In some embodiments, the hardware comprises one or more software-controlled processors. FIG. 9 schematically depicts a wireless device 10, which comprises a sensor system 12 that includes sensors designated by 12A-12N. The wireless device 10 further comprises a processing system 61, computer memory 62, and a wireless communication system 13, which is at least configured for WWAN communication (cf. 13A in FIG. 2). The processing system 61 may include one or more of a CPU ("Central Processing Unit"), a DSP ("Digital Signal Processor"), a GPU ("Graphics Processing Unit"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 62A comprising computer instructions is stored in the memory 62 and executed by the processing system 61 to implement logic that performs any of the methods, procedures, functions, operations, or steps described in the foregoing. The control program 62A may be supplied to the wireless device 10 on a computer-readable medium 64, which may be a tangible (non-transitory) product (for example, magnetic medium, optical disk, read-only memory, flash memory, etc.). As indicated in FIG. 9, the memory 62 may also store control data 62B for use by the processing system 61, such as transport-related data (TRD), the target probability, definition data for the first and second time intervals ($\Delta 1$, $\Delta 2$ in FIG. 3C), definition data for encoding and decoding of signals S1, S1', etc.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results.

The foregoing description is also applicable to other definitions of the first and second states, which may or may not relate to wireless communication. Generally, the second state may reflect any real-life context in which an alternative operating mode of an electronic device is beneficial to its power consumption because of natural limitations imposed by that context. For example, switching from the first state to the second state may cause an electronic device to disable part of its sensor system and/or refrain from collecting and storing sensor data. Such an electronic device may or may not include a transceiver for WWAN communication or wireless short-range communication.

In the following, clauses are recited to summarize some aspects and embodiments as disclosed in the foregoing.

C1. A method performed by an electronic device (10) comprising a sensor system (12), said method comprising: evaluating (301) sensor data from the sensor system (12) for detection of a first condition, which indicates that a specific mode of transport of the electronic device (10) has begun; switching (302) the electronic device (10) from a first state to a second state upon detection of the first condition; obtaining (303) a predicted time to arrival at a destination; performing (304) a status check at a selected time point in relation to the predicted time of arrival, for detection of an arrival of the electronic device (10) at the destination; and switching (305) the electronic device (10) from the second state to the first state upon detection of the arrival.

C2. The method of clause C1, wherein said performing (304) the status check comprises evaluating the sensor data from the sensor system (12) for detection of a second condition, which is indicative of the arrival of the electronic device (10) at the destination.

C3. The method of any preceding clause, wherein the electronic device (10) comprises a transceiver (13A) for wireless WAN communication, and wherein the transceiver (13A) is enabled in the first state, and disabled in the second state.

C4. The method of C3, wherein the method further comprises: operating (311, 313) the transceiver (13A) to periodically transmit data at a nominal time interval ($\Delta 1$) when the electronic device (10) is in the first state, and wherein said performing (304) the status check is repeated, periodically or non-periodically, at a further time interval ($\Delta 2$), the further time interval being set in relation to the predicted time to arrival, and optionally in relation to the nominal time interval ($\Delta 1$).

C5. The method of C3 or C4, wherein the electronic device (10) is a tracking device, and wherein the method further comprises: operating (311) the transceiver (13A) for wireless WAN communication to transmit position data when the electronic device (10) is in the first state.

C6. The method of any preceding clause, wherein the selected time point is at or after the predicted time of arrival.

C7. The method of any preceding clause, further comprising: repeatedly and sequentially obtaining (303) the predicted time to arrival and performing (304) the status check until the arrival is detected.

C8. The method of any preceding clause, wherein the destination is unknown.

C9. The method of any preceding clause, wherein said obtaining (303) the predicted time of arrival comprises: determining the predicted time of arrival for a current value of elapsed time or estimated travel distance since the detection of the first condition.

C10. The method of C9, wherein said obtaining (303) the predicted time of arrival comprises: determining (323) a probability distribution for remaining time of transport, and determining (324) the predicted time of arrival based on the probability distribution.

C11. The method of C10, wherein said determining (324) the predicted time of arrival comprises: calculating (324A), for the probability distribution, an accumulated probability as a function of the remaining time, and setting (324B) the time of arrival to the remaining time that results in a predefined value of the accumulated probability.

C12. The method of C10 or C11, wherein the probability distribution represents, for each value of the remaining time, a conditional probability given the current value of elapsed time or estimated travel distance since the detection of the first condition.

C13. The method of any one of C10-C12, wherein said determining the probability distribution comprises: obtaining (322) and processing (323) transport-related data, said transport-related data comprising at least one of: statistical data of durations of transports of the electronic device (10) and/or other electronic devices (10'), an identifier of a departure point (A1) for the transport of the electronic device (10), route data that indicates candidate transport routes for the transport of the electronic device (10), or a transport route for the transport of the electronic device (10).

C14. The method of any preceding clause, wherein the electronic device (10) further comprises a transceiver (13B) for short-range wireless communication, and wherein said obtaining (303) the predicted time of arrival comprises: operating the transceiver (13B) for short-range wireless communication to receive the predicted time of arrival from one or more further electronic devices (10').

C15. The method of C14, further comprising: operating the transceiver (13B) for short-range wireless communication to transmit the predicted time of arrival.

C16. The method of any preceding clause, wherein the specific mode of transport is non-land-based.

C17. The method of any preceding clause, wherein the first condition is defined to be representative of transport by aircraft or ship.

C18. The method of C17, wherein the first condition indicates takeoff of the aircraft.

C19. A computer-readable medium comprising instructions which, when installed on a processing system (61), causes the processing system (61) to perform the method of any one of C1-C18.

C20. An electronic device comprising a sensor system (12), and logic (61, 62A) configured to: evaluate sensor data from the sensor system (12) for detection of a first condition, which indicates that a specific mode of transport of the electronic device (10) has begun; switch the electronic device (10) from a first state to a second state upon detection of the first condition; obtain a predicted time to arrival at a destination; perform a status check at a selected time point in relation to the predicted time of arrival, for detection of an arrival of the electronic device (10) at the destination; and switch the electronic device (10) from the second state to the first state upon detection of the arrival.

C21. The electronic device of C20, wherein the logic (61, 62A) is configured, when performing the status check, to: evaluate the sensor data from the sensor system (12) for detection of a second condition, which is indicative of the arrival of the electronic device (10) at the destination.

C22. The electronic device of C20 or C21, which further comprises a transceiver (13A) for wireless WAN communication, and wherein the transceiver (13A) is enabled in the first state and disabled in the second state.

C23. The electronic device of C22, wherein the logic (61, 62A) is further configured to: operate the transceiver (13A) to periodically transmit data at a nominal time interval ($\Delta 1$) when the electronic device is in the first state, and to repeat the status check, periodically or non-periodically, at a further time interval ($\Delta 2$), the further time interval being set in relation to the predicted time to arrival, and optionally in relation to the nominal time interval ($\Delta 1$).

C24. The electronic device of C22 or C23, which is a tracking device, and wherein the logic (61, 62A) is further configured to: operate the transceiver (13A) for wireless WAN communication to transmit position data when the electronic device (10) is in the first state.

C25. The electronic device of any one of C20-C24, wherein the selected time point is at or after the predicted time of arrival.

C26. The electronic device of any one of C20-C25, wherein the logic (61, 62A) is further configured to: repeatedly and sequentially obtain the predicted time to arrival and perform the status check until the arrival is detected.

C27. The electronic device of any one of C20-C26, wherein the destination is unknown.

C28. The electronic device of any one of C20-C27, wherein the logic (61, 62A) is configured, when obtaining the predicted time of arrival, to: determine the predicted time of arrival for a current value of elapsed time or estimated travel distance since the detection of the first condition.

C29. The electronic device of C28, wherein the logic (61, 62A) is configured, when obtaining the predicted time of arrival, to: determine (323) a probability distribution for remaining time of transport, and determine (324, 325) the predicted time of arrival based on the probability distribution.

C30. The electronic device of C29, wherein the logic (61, 62A) is configured, when obtaining the predicted time of arrival, to: calculate, for the probability distribution, an accumulated probability as a function of the remaining time, and set the time of arrival to the remaining time that results in a predefined value of the accumulated probability.

C31. The electronic device of C29 or C30, wherein the probability distribution represents, for each value of the remaining time, a conditional probability given the current value of elapsed time or estimated travel distance since the detection of the first condition.

C32. The electronic device of any one of C29-C31, wherein the logic (61, 62A) is configured, when determining the probability distribution, to: obtain and process transport-related data, said transport related data comprising at least one of: statistical data of durations of transports of the electronic device (10) and/or other electronic devices (10'), an identifier of a departure point (A1) for the transport of the electronic device (10), route data that indicates candidate transport routes for the transport of the electronic device (10), or a transport route for the transport of the electronic device (10).

C33. The electronic device of any one of C20-C32, further comprising a transceiver (13B) for short-range wireless communication, and wherein the logic (61, 62A) is configured, when obtaining the predicted time of arrival, to: operate the transceiver (13B) for short-range wireless communication to receive the predicted time of arrival from one or more further electronic devices (10').

C34. The electronic device of C33, wherein the logic (61, 62A) is further configured to: operate the transceiver (13B) for short-range wireless communication to transmit the predicted time of arrival.

C35. The electronic device of any one of C20-C34, wherein the specific mode of transport is non-land-based.

C36. The electronic device of any one of C20-C35, wherein the first condition is defined to be representative of transport by aircraft or ship.

C37. The electronic device of C36, wherein the first condition indicates takeoff of the aircraft.

What is claimed is:

1. A method performed by an electronic device comprising a sensor system, said method comprising:
evaluating sensor data from the sensor system for detection of a first condition that indicates that a specific mode of transport of the electronic device has begun;
switching the electronic device from a first state to a second state upon detection of the first condition;
obtaining a predicted time of arrival at a destination;
setting a selected time point in relation to the predicted time of arrival based on a priority between reducing power consumption of the electronic device while in the second state and a time delay between an actual arrival of the electronic device at the destination and a detection of the electronic device at the destination;
performing a status check at the selected time point; and
switching the electronic device from the second state to the first state upon detection of the arrival of the electronic device at the destination.

2. The method of claim 1, wherein said performing the status check comprises evaluating the sensor data from the sensor system for detection of a second condition, which is indicative of the arrival of the electronic device at the destination.

3. The method of claim 1, wherein the electronic device comprises a transceiver for wireless WAN communication, and wherein the transceiver is enabled in the first state, and disabled in the second state.

4. The method of claim 3, wherein the method further comprises:
operating the transceiver to periodically transmit data at a nominal time interval when the electronic device is in the first state, and wherein said performing the status check is repeated, periodically or non-periodically, at a further time interval, the further time interval being set in relation to the predicted time of arrival, and optionally in relation to the nominal time interval.

5. The method of claim 3, wherein the electronic device is a tracking device, and wherein the method further comprises:
operating the transceiver for wireless WAN communication to transmit position data when the electronic device is in the first state.

6. The method of claim 1, wherein the selected time point is at or after the predicted time of arrival.

7. The method of claim 1, further comprising:
repeatedly and sequentially obtaining the predicted time of arrival and performing the status check until the arrival is detected.

8. The method of claim 1, wherein the destination is unknown.

9. The method of claim 1, wherein said obtaining the predicted time of arrival comprises: determining the predicted time of arrival for a current value of elapsed time or estimated travel distance since the detection of the first condition.

10. The method of claim 9, wherein said obtaining the predicted time of arrival comprises:
determining a probability distribution for remaining time of transport, and determining the predicted time of arrival based on the probability distribution.

11. The method of claim 10, wherein said determining the predicted time of arrival comprises:
calculating, for the probability distribution, an accumulated probability as a function of the remaining time, and setting the time of arrival to the remaining time that results in a predefined value of the accumulated probability.

12. The method of claim 10, wherein the probability distribution represents, for each value of the remaining time, a conditional probability given the current value of elapsed time or estimated travel distance since the detection of the first condition.

13. The method of claim 10, wherein said determining the probability distribution comprises:
obtaining and processing transport-related data, said transport-related data comprising at least one of:
statistical data of durations of transports of the electronic device and/or other electronic devices,
an identifier of a departure point for the transport of the electronic device,
route data that indicates candidate transport routes for the transport of the electronic device, or
a transport route for the transport of the electronic device.

14. The method of claim 1, wherein the electronic device further comprises a transceiver for short-range wireless communication, and wherein said obtaining the predicted time of arrival comprises:
operating the transceiver for short-range wireless communication to receive the predicted time of arrival from one or more further electronic devices.

15. The method of claim 14, further comprising: operating the transceiver for short-range wireless communication to transmit the predicted time of arrival.

16. The method of claim 1, wherein the specific mode of transport is non-land-based.

17. The method of claim 1, wherein the first condition is defined to be representative of transport by aircraft or ship.

18. The method of claim 1, wherein the first condition indicates takeoff of the aircraft.

19. A non-transitory computer-readable medium comprising instructions that, when installed on a processing system of an associated electronic device, causes the processing system to perform a method comprising:
evaluating sensor data from a sensor system for detection of a first condition that indicates that a specific mode of transport of the electronic device has begun;
switching the electronic device from a first state to a second state upon the detection of the first condition;
obtaining a predicted time of arrival at a destination;
setting a selected time point in relation to the predicted time of arrival based on a priority between reducing power consumption of the electronic device while in the second state and a time delay between an actual arrival of the electronic device at the destination and a detection of the electronic device at the destination;
performing a status check at the selected time point; and switching the electronic device from the second state to the first state upon the detection of the arrival of the electronic device at the destination.

20. An electronic device comprising a sensor system, and logic configured to:
    evaluate sensor data from the sensor system for detection of a first condition, which indicates that a specific mode of transport of the electronic device has begun;
    switch the electronic device from a first state to a second state upon detection of the first condition;
    obtain a predicted time of arrival at a destination;
    set a selected time point in relation to the predicted time of arrival based on a priority between reducing power consumption of the electronic device while in the second state and a time delay between an actual arrival of the electronic device at the destination and a detection of the electronic device at the destination;
    perform a status check at the selected time point; and
    switch the electronic device from the second state to the first state upon detection of the arrival of the electronic device at the destination.

* * * * *